(12) United States Patent
Mascarenhas et al.

(10) Patent No.: US 11,514,626 B2
(45) Date of Patent: Nov. 29, 2022

(54) SYSTEM AND METHOD FOR MACHINE LEARNING BASED IMAGE GENERATION

(71) Applicants: Susanna Valentina Mascarenhas, Goa (IN); Calum Dale Joe Mascarenhas, Mississauga (CA); Marika Joan Mascarenhas, Goa (IN); Nishant Mathur, Jaipur (IN)

(72) Inventors: Susanna Valentina Mascarenhas, Goa (IN); Calum Dale Joe Mascarenhas, Mississauga (CA); Marika Joan Mascarenhas, Goa (IN); Nishant Mathur, Jaipur (IN)

( * ) Notice: Subject to any disclaimer, the term of this patent is extended or adjusted under 35 U.S.C. 154(b) by 0 days.

(21) Appl. No.: 17/444,323

(22) Filed: Aug. 3, 2021

(65) Prior Publication Data
US 2022/0067989 A1    Mar. 3, 2022

Related U.S. Application Data

(60) Provisional application No. 62/706,562, filed on Aug. 25, 2020.

(30) Foreign Application Priority Data

Apr. 30, 2021   (CA) ................................ CA 3116757

(51) Int. Cl.
| | | |
|---|---|---|
| *G06T 11/20* | (2006.01) | |
| *G06N 3/063* | (2006.01) | |
| *G06T 11/60* | (2006.01) | |

(52) U.S. Cl.
CPC ............ *G06T 11/203* (2013.01); *G06N 3/063* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,306,006 A * | 4/1994 | Bell ...................... | A63F 9/0098 273/156 |
| 9,424,584 B2 * | 8/2016 | Klappert ............... | G06F 16/345 |
| 11,004,246 B1 * | 5/2021 | Cheng .................. | G06F 3/0481 |
| 2006/0206918 A1 * | 9/2006 | McLean ................ | G06F 21/31 726/2 |
| 2019/0057617 A1 * | 2/2019 | Kim ...................... | A63H 33/08 |
| 2020/0066014 A1 * | 2/2020 | Mehta .................. | G06F 16/5866 |

OTHER PUBLICATIONS

Now you see ArT (https://www.youtube.com/watch?v=9Ztycgu9T_A, Jun. 28, 2018) (Year: 2018).*

* cited by examiner

*Primary Examiner* — Jeffrey J Chow
(74) *Attorney, Agent, or Firm* — Innovation Capital Law Group, LLP; Vic Lin

(57) ABSTRACT

An artificial intelligence and machine learning system and method for image generation. The method comprising receiving a word comprising language characters, processing each of the characters in the word into visual elements, generating an image using the visual elements of the characters. The AI system may receive a name of a person such as 'Amy' and may process the name into visual elements that when positioned and oriented relative to each other, form a face. The letter 'a' may be used as the outline of the face, the letter 'm' positioned within the 'a' may be used to depict closed eyes and the letter 'y' positioned within the 'a' and below the 'm' may be used to depict a nose and mouth.

20 Claims, 25 Drawing Sheets

S. John

J

Jo

Joh

John

1. Alex

A

Al

Ale

Alex

2. Amy

A

Am

Amy

3. David

D

Da

Dav

Davi

David

4. Emily

E

Em

Emi

Emil

Emily

5. Fion

F

Fi

Fio

Fion

6. Fiona

F

Fi

Fio

Fion

Fiona

9. Lawrence

L

La

Law

Lawr

Lawre

Lawren

Lawrenc    Lawrence

10. Marika

M

Ma

Mar

Mari

Marik

Marika

11. Mary

M

Ma

Mar

Mary

12. Michael

M

Mi

Mic

Mich

Micha

Michae   Michael

13. Paul

P

Pa

Pau

Paul

14. Sarah

S

~

Sa

~ @

Sar

Sara

Sarah

15. Sean

S

Se

Sea

Sean

17. Steven

S

St

Ste

Stev

Steve

Steven

Figure 19

18. Trevor

T

Tr

Tre

Trev

Trevo

Trevor

Name: Cassandra

1. Concerned Expression

SYSTEM AND METHOD FOR MACHINE LEARNING BASED IMAGE GENERATION

FIELD

The present application relates to a system and method for image generation utilizing artificial intelligence (AI) and machine learning (ML). More particularly, the present application relates to a system and method for AI generated images using language characters.

BACKGROUND

Consumers are more interested in unique and personalized products for themselves and also to give as gifts. Examples of conventional personalized products that incorporate a person's name include story books where the individual and others are named characters and also jewelry (e.g., initials or the full name like Anna).

When creating images that are personalized with a word or name, it is a complex, voluminous and cumbersome task to determine how to incorporate the word or name (or the language characters within the word) to create a personalized image or picture, given the large number of available names, and various language characters in the world.

As well, a problem with personalized products incorporating a name like jewelry and clothing is that as it displays the person's name, the person has lost some of their anonymity. As fraud and identity theft increases, there is a need to keep personal information, such as your name, safe and protected. As such, there is a need for an improved system and method for efficiently generating personalized images and products.

SUMMARY

The present application provides a system and method for generating images using artificial intelligence (AI) that utilizes letters as elements in the image design. In the example embodiments, the letters in a name are used to generate an image of a human face. The name is discreetly incorporated in the image such that the name is not readily discernable or apparent from the generated image (e.g., hidden). That is, one would not be able to easily determine the name that is 'encoded' or 'embodied' in the image.

Generating images manually using letters to form the elements of the image takes time to determine what letters there are, the options of uppercase and lowercase letters and how each letter will be utilized in the image. Accordingly, the present application utilizes an AI system and method for evaluating, processing and generating images using letters.

The letters or characters may be of varying sizes, scrambled in any order, placed at any angle, positioned forwards, backwards, above or below, inverted, skewed, looped, encased or nested within other characters in order to form a face. The resulting image may have special effects such as for example beveling, shadow, 3D effect, rotation, be inclined to the plain, have soft edges, glow effect and depth. Secondary elements may also be added to the image of a face, including for example mustache, earrings, eyebrows, eyeglasses, hijab, turban, headdress and other accessories worn by a person.

The base character set is the Roman (e.g., Latin) alphabet, however the system and method is scalable to other character sets and languages, such as for example Devnagiri, Urdu, Arabic and Cyrillic. The generated image may be used to create personalized merchandise and memorabilia. For example, the image may be superimposed, embossed, etched, laser cut (e.g., completely cut out or raised and relief type), die-cast, molded, and printed on a suitable material for an item chosen by a consumer.

An artificial intelligence and machine learning system and method are provided for image generation. The method comprises receiving from a remote input/output device a word comprising language characters, processing each of the characters in the word into visual elements, generating an image using the visual elements of the characters, and outputting, to the input/output device, the generated image.

The AI system may receive a name of a person such as 'Amy' and may process the name into visual elements, that when positioned and oriented relative to each other form a face. The letter 'a' may be used as the outline of the face, the letter 'm' positioned within the 'a' may be used to depict closed eyes and the letter 'y' positioned within the 'a' and below the 'm' may be used to depict a nose and mouth.

A method for generating images, the method comprising receiving a word comprising language characters; processing each of the characters in the word into visual elements; generating an image using the visual elements of the characters. The method may further include outputting the generated image to a remote device. The step of processing may further comprise parsing the word into individual characters; determining one or more image elements that depict each of the individual characters; and assigning an image element for each of the individual characters. The method may be performed using an artificial intelligence (AI) system.

A system for generating images, the system comprising a processor, wherein the processor performs the steps of: receiving a word comprising language characters; processing each of the characters in the word into visual elements; generating an image using the visual elements of the characters. The processor may be an artificial intelligence (AI) processor. The generated image may be outputted to a remote device or interface where a user may make modifications to the generated image.

A non-transitory computer readable medium having stored thereon a set of computer readable instructions that when executed by at least one processor, causes the processor to generate an image, the steps comprising: receiving a word comprising language characters; processing each of the characters in the word into visual elements; generating an image using the visual elements of the characters. The generated image may be outputted to a remote device. The processor may be an artificial intelligence (AI) processor. The generated image may be outputted to a remote device or interface where a user may make modifications to the generated image.

BRIEF DESCRIPTION OF THE DRAWINGS

FIG. 19 illustrates a process for constructing a face image using the name 'Steven' in accordance with an example embodiment of the present application;

DETAILED DESCRIPTION

To the accomplishment of the foregoing and related ends, certain illustrative aspects are described herein in connection with the following description and the annexed drawings. These aspects are indicative of the various ways in which the principles disclosed herein can be practiced. Other advantages and novel features will become apparent from the following detailed description when considered in conjunction with the drawings.

The system and method of the present application is driven by an AI algorithm which contains a framework that recognizes the specific characteristics of letters and based on Machine Learning (ML) allocates priorities to each letter in different scenarios. This learning is then used to create individualistic designs which are shown to the consumer and then accepted for merchandising accordingly. According to the present process, the faces can be generated to depict human emotional or abstract states such as the example embodiments shown in FIGS. 3 to 21. In the example embodiments, the images are generated based on the letters in a given name of a person, however in other embodiments the images may be based on letters in the surname of a person, the name of a pet, the name of an animal, country, city etc. or may be based on the letters in any desired word (e.g., sunshine).

Figure 1A:
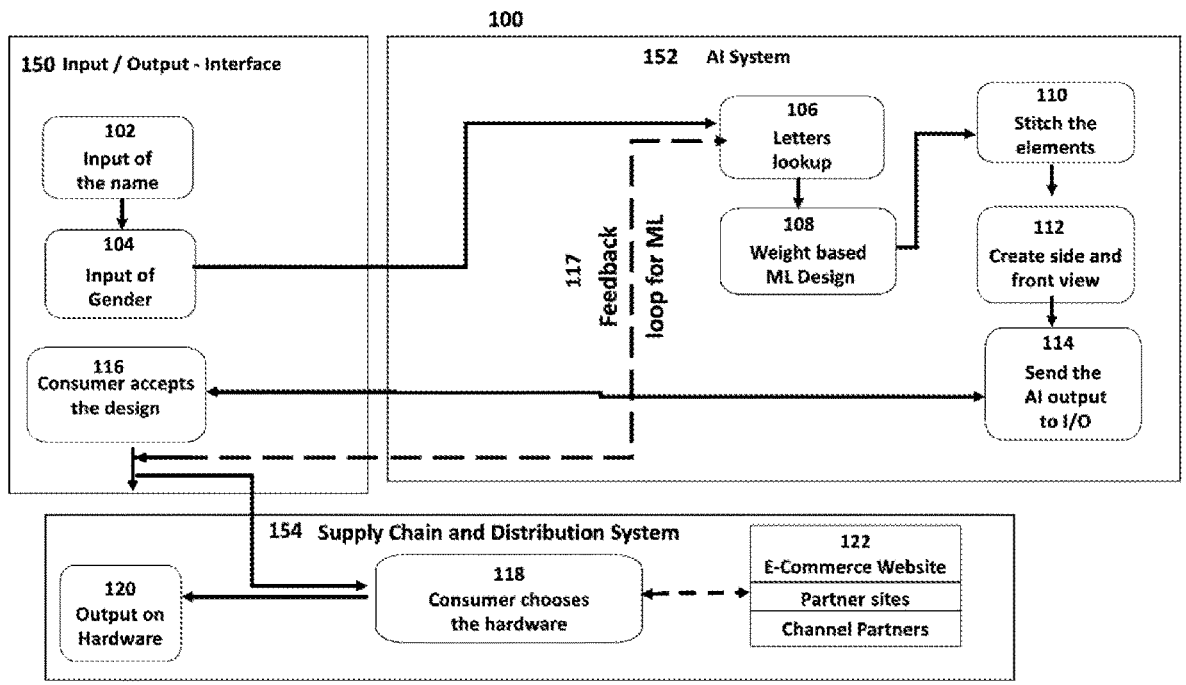
FIG. 1A is block system diagram in accordance with one example embodiment of the present application.

FIG. 1A illustrates a block and process diagram of an AI image generation system 100 in accordance with an example embodiment of the present application. The system includes an input/output device or interface 150 (e.g., computer, mobile device, online sales website, web application, mobile application, remote device or interface) and an AI processing unit 152. The input interface 150 receives one or more inputs that are used to generate an image, facilitates the selection of a finalized image design and the purchase of products that contain the design. In some embodiments, the images may be generated based on multiple inputs (e.g., more than two). The input/output interface 150 may be a graphical user interface (GUI) available on a webpage that allows a user (e.g., consumer) to input a name that they want an image generated of. For example, the process of the system begins with a user or customer inputting a name of person (block 102) (e.g., 'John;) and may further include one or more other inputs (e.g., secondary input) such as for example gender (e.g., male, female, non-binary) (block 104). As well, the user may select other characteristics and features to be included in the image, for example expressions (e.g., happy, sad) and visual elements (e.g., long hair, large eyes). Next, the inputs (blocks 102, 104) are sent to the AI processing unit 152.

The AI processing unit 152 (may also be referred to as 'AI application', 'AI processor' or 'AI system') takes the inputted name and identifies each of the letters within the name and accesses an element lookup database (block 106). In an example embodiment, the AI unit 152 may include frameworks or libraries, storage (e.g., one or more databases), AI plugins, APIs, AI applications, graphic processing units (GPUs) and may be implemented on a server, web server or cloud based. The images are generated using primary element data and in some embodiments secondary element data (and in some embodiments further tertiary elements) that are the baseline and building block elements for image constructions. The element lookup database contains the elements or source components (e.g., primary and secondary elements) that are used to generate the image. The primary element data may be provided by a graphic designer to the system 100 via the input/output interface 150 (e.g., a graphic designer may provide cursive or artistic renderings of letters) or via the AI unit 152 by computer generation. Primary element data may include the letters of the Roman/Latin alphabet A to Z in capital letters as well as lower case letters (a to z), cursive capital letters (A to Z) and cursive lower case letters (a to z). In other embodiments, the primary element data may also include various types of typography for each letter (e.g., Arial, Times New Roman, Verdana etc.). Variants of the characters in traditional form are also available as primary elements, such as for example artistic and freeform renderings of characters, right and left hand biased, mirror images, inclines of varying degrees to the horizontal (e.g., 30, 60 and 90 degrees), 2-dimensional and 3-dimensional representations, combination characters to represent 2 letters that share a common structure (e.g., 'I' and 'P' in combination), and character lines of varying thickness. The variants may be used to emphasize certain facial features (e.g., short vs. long hair) and also to ensure reproducibility on various types of products (e.g., fine lines for small objects like jewelry, medium lines for mugs, heavy lines for larger objects like t-shirts). For example, with the name 'Alex' the AI unit 152 would look up all available primary elements available for each letter in the name. With the letter 'A' for example, the element lookup database may include an uppercase 'A', lowercase 'a', one or more cursive versions of each, and one or more stylized versions of each.

The secondary element data may be provided by a graphic designer to the system 100 via the input/output interface 150 by computer generation. Secondary element data may include additional facial features and accessories such as for example, eyelashes, hair, eyebrows, and headgear (e.g., hats, turbans, hijabs). The additional features may also be defined and generated based on the gender identified or selected for the image (e.g., longer hair for a female, typical male hairstyles). As well, the secondary element data may also be influenced by the selection of a mood, emotion, expressions, states or other visual characteristics identified for the image. The state or expression will result in different images being generated to reflect different emotions and expressions, such as for example happy, mischievous, thoughtful, rascal, bandit, pirate, daring, and soulful. The example embodiments shown in FIGS. 3 to 21 show generated images that reflect various types of emotions and expressions. The generated image may be comprised solely of the visual elements of the language characters.

With the information from the element lookup database (e.g., primary elements, secondary elements etc.), the AI processing unit 152 then generates an image using each of the letters of the inputted name using a weight-based machine learning design. The weight-based ML design designates how each of the letters will be used in the designed image (block 108). The weight-based ML design is further described in reference to FIG. 2A and FIG. 2B. For example, for the name Alex (see for example FIG. 3), the weight-based ML design may determine that the best letter within the name to be utilized to illustrate an eye is the letter 'A'. The ML design will determine how each of the letters in the name will be used to illustrate the various features of the image (e.g., features of a face). The ML design learns from previous designs to determine what letters are typically used for the features of the image. In the example of an image of a face, the ML design learns what letters are typically used for and/or are most conducive for illustrating eyes, nose, mouth, hair etc.

Once the letters have been assigned to illustrate elements in the image, the AI processing unit 152 combines or 'stitches' the letter elements together to form the resulting image (block 110) (in the example embodiments, the resulting image is a face). Next, images are designed for one or both of a side view and a front view (block 112). The resulting designed images are transmitted to the input/output interface 150 (block 114). The user (e.g., customer, designer etc.) may review the one or more designs on the input/output interface 150 (block 116). As well, the user may edit or amend the design by, for example, making one of the image elements larger or small (e.g., extending hair to be longer). If the user makes or requests changes to the image, the information regarding the changes is fed back to the AI processing unit 152 via a feedback loop 117 to the start of block 106.

The consumer may be provided with more than one image representing the name to select from. For example, FIGS. 22 and 23 for two different images generated for the names Cassandra and Kate. For the name Kate, the consumer may view both images for Kate and select one of the images. Also, in some embodiments, the user may be able to add, edit or adjust the alphabet or individual letters with respect to size, shape, style etc. In one example embodiment, the user may access and select the letters on the screen and adjust the orientation, size, skew as desired using their input device (e.g., mouse, keyboard, gestures on touch screen). For example, in FIG. 16 for the name Sarah, the user may be able to make hair longer or shorter by adjusting the letter 'R' in the image.

After the user accepts the design, in the example embodiment the information is sent to a supply chain and distribution system 154 where the user may then choose a product that the design will be applied to or incorporated onto (block 118). For example, the products may be a mug, t-shirt, framed art, etc. Information regarding the selected product is transmitted via the internet to a manufacturer to produce the product (block 120). As well, the input/output interface 150 and the supply chain and distribution system 154 also may interact with $3^{rd}$ party websites, such as e-commerce website providers/processors for example to process the sale transaction (block 122).

The AI processing unit 152 may be used to analyse the most common first names in a given country or region. For example, out of 295 million Americans, there are only about 32000 unique first names (Source: US Census data 2015). From this analysis, the AI unit 152 may identify the most common letters in each name as well as average, mean and median number of letters in a name. The AI system may also be trained to not process names that are religious or sensitive in nature or that may be against public morality.

Training data sets are provided to the AI processing unit 152 as a baseline for future image constructions and machine learning. The training data includes constructed faces for the AI to learn from. The generated images shown in FIGS. 3 to 23 are examples of training data provided to the AI system. The images of FIGS. 3 to 23 may be analyzed to determine and develop training data regarding the relationship between the visually depicted letters, such as the size, orientation and position of the visually depicted letters. As well, the training data may include labelled datasets that identify the facial features the visual elements should be used for, for example, primary input elements that are labelled as 'eyes' are visual letter elements best suited to depict eyes. The machine learning algorithm that is used may be supervised learning (or semi-supervised) done through tagging preferred images by a human.

The AI program is fluid, dynamic and interactive. The AI program and process is self-learning and self-improving. It may learn from the preferences and choices made by customers under different scenarios as well as for varying geographic environments. For example, an individual may prefer facial features that resemble themselves or those living in a particular geographical location (e.g., shape of eyes, nose, mouth etc.). Based upon the frequency of use, the AI may build a memory for which components of the face are in high demand and then it implements this knowledge through utilization of the said components. Given the volume of information and potential combinations this type of self-improvement and self-learning necessitates an AI implementation. The AI process and program of the present application cannot efficiently be performed by non-AI implementations (e.g., especially for a large volume of potential names).

Figure 1B:
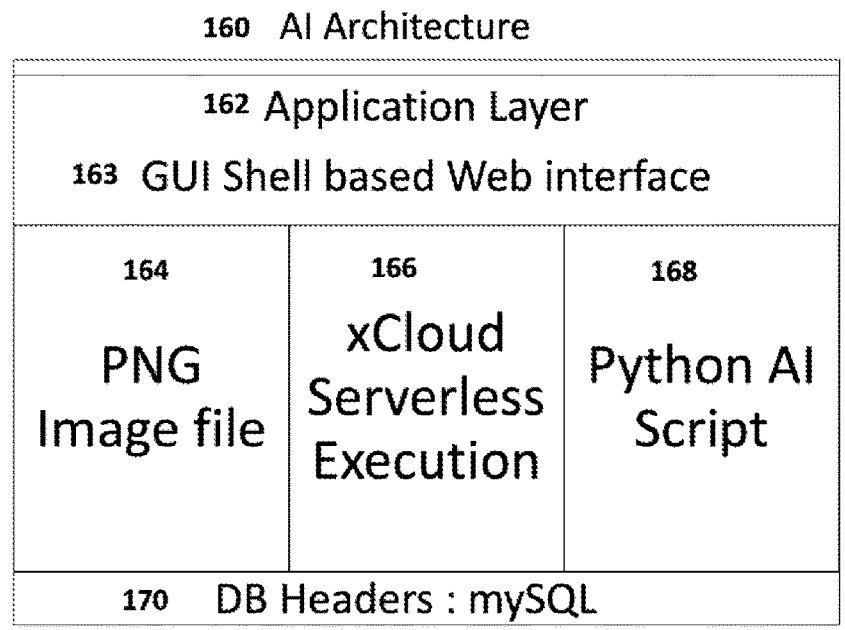
FIG. 1B is an AI architecture diagram in accordance with one example embodiment of the present application.

FIG. 1B illustrates an example architecture 160 of the AI processing unit 152. An application layer 162 for front ending the AI program. A user interface layer 163 (e.g., GUI Shell based web interface), the interactive Ux-User Interface 163 can integrate with any gamification user modules, partner modules or act as a feed to a collective offering of any e-commerce web/mobile based application. An image file 164 is the output of AI process. It is an independent module that is feeds in and to the application layer 162 and the user interface layer 163 and is the result of operations in 168 and 166. A cloud computing execution model 166 such as for example XCloud Serverless Execution for storage of data, ensuring 'n' level redundancy and failproof execution by guaranteeing periodic backups, quick scalability and reduction in asset management cost. An AI programming language 168 (for example, Python AI script, C++, Java). For Python's unparalleled set of libraries, Python is best suited for ML modules and for enhanced server side processing. A relational database 170 for storing base images for AI and for storing interactive preferential images of the end user, visit specs for analytics (for example, mySQL).

Figure 2A:
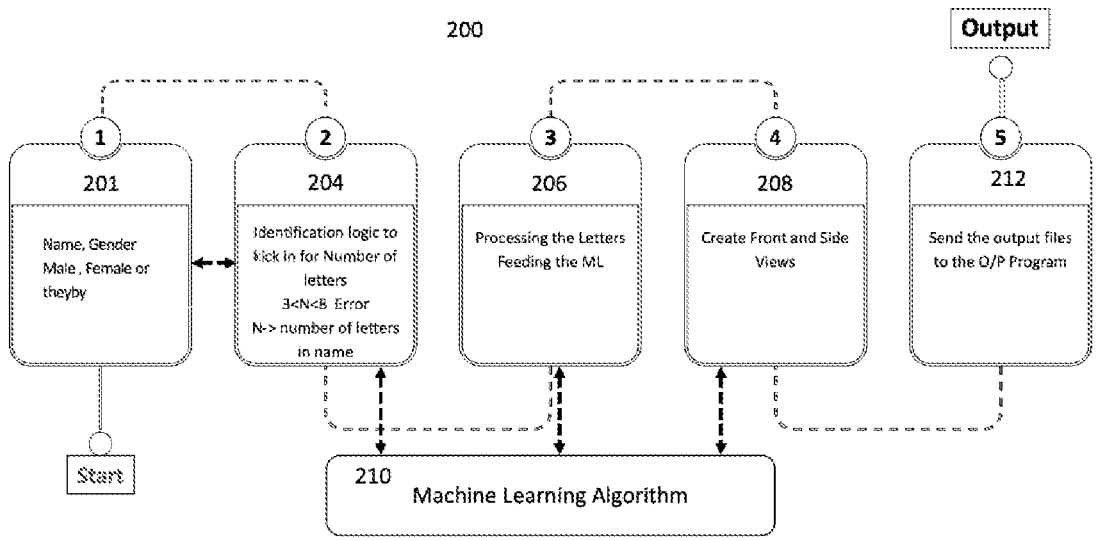
FIG. 2A is a process diagram of the AI program in accordance with an example embodiment of the present application.

FIG. 2A illustrates a process diagram of the AI processing unit 152 according to an example embodiment of the present application. The AI unit 152 receives via wireless communication (e.g., internet) the input parameters for an image to be designed from the input/output interface 150 (block 202). The inputs may include a name (e.g., Alex) and a gender (e.g., male, female, non-binary). Next the AI unit 152 processes the inputs, including applying identification logic to the letters contained in the inputted name and looking up the letters in the lookup element database (block 204). For example, the AI unit 152 determines the number of letters in the name, with in an example embodiment the optimal number of letters being greater than 3 and less than 8. If the number of letters is outside of this range, the AI unit 152 may transmit an error message to the input/output interface 150 and request the input of a new name. Next, the letters are processed to determine how they will be used to generate the image (block 206).

For example in block 206, the AI unit 152 processes and allocates the letters in the name based on its statistical analysis of names and based on training data to identify the best usage of the letters to form a face. The AI unit 152 may take into account the different forms of a letter (e.g., uppercase, lowercase, cursive, freeform), various typography for each letter, the various parts (e.g., strokes) of each letter that may be used to depict facial features (e.g., letter parts may include arm, leg, ear, shoulder, spine, tail, stem, bar, loop). The AI unit 152 may allocate the letters in the name most suitable for creating face boundaries, allocates the letters in the name most suitable for creating eyes, allocates the letters in the name most suitable for creating a nose, and allocates the letters in the name most suitable for creating ears. Also, the AI unit 152 may allocate different parts of a single letter to depict more than one facial feature (e.g., see FIG. 4). As well, the AI unit 152 may allocate the letters in the name that are most suitable for artistic and freeform rendering. Freeform rendering of characters may be used for example as a portion of the face boundary, to depict various hairstyles and forming eyebrows. The AI unit 152 may also allocate the letters in the name most suitable for 3D projection (e.g., to emphasize facial features) and for joint structure sharing (e.g., 'T' and 'P' combined to form a singular character). The AI unit 152 also determines the placement of facial features in the image based on the consumer selection and preference. For example, the consumer may select the image is to be a front view image with left or right hand biased or direction. The AI unit 152 may determine that the eyes and nose are to be a particular percentage size of the overall face and positioned at specific coordinates depending on the view (e.g., front, side) and any directional selection (e.g., left or right hand biased). The AI unit 152 may also include rules that may dictate how the image is generated and may override consumer selections and preferences. For example, if a name is short (e.g., only 3 letters), it will be determined that the face will be generated in a side view. Also, for example if the name is 'Amy', based on previous generated images and training data, the 'a' should be used in a cursive form to form the face boundary (see for example FIG. 4). Other rules may be developed to handle names comprising a large number of characters and also to provide more than one generated image based on the same input (e.g., 2 images both representing the name). For example, see FIGS. 22 and 23 for two different images generated for the names Cassandra and Kate.

In some embodiments, for each generated image of a face, there are 10 to 12 features of the face to be assigned and depicted with the available letters. As well, for an image to depict the expression 'happy', in an example embodiment approximately 940 primary and secondary elements may be created and included in the lookup element database where these elements are designated (e.g., labelled) and available to be used as element inputs for a generated 'happy' image. The data in the lookup element database (and other AI databases and libraries in the AI unit 152) such as primary and secondary elements may be labelled or unlabelled. For example, the input elements may be labelled based on the facial feature they may depict (e.g., eyes, nose, mouth), the mood they depict (e.g., happy, sad), the face profile they are applicable to (e.g., side face profile, front face profile). The input elements and other data may be labelled based on other categories, classifications, and determinations. Given all the available permutations of letter elements (e.g., uppercase, lowercase, cursive, artistic freeform), typography styles, face features, secondary input features (e.g., emotions or mood) and positioning of letters, the process of generating an image of a face using letters is a complex, voluminous and cumbersome task. The use of AI and machine learning more quickly determines available visual elements, classify images and elements, and formulate a combination of visual elements that form an overall image as compared to non-AI implementations. It is not a process that can quickly or efficiently be performed by non-AI implementations. As such, the AI unit 152 provides significant computing and processing capabilities that facilitate the generation of customized images based on user (e.g., customer) inputs such as a name. For example, the use of AI and machine learning more quickly determines the letters within the inputted name, the available visual elements representing those letters, classifies images and elements, and formulates a combination of visual elements that form overall images, as compared to these steps being performed by non-AI implementations.

Next, the AI unit 152 generates one or more images using the letters that were processed in the previous step (block 206) to generate the desired image (e.g., in the example embodiments, a face) (block 208). The images may include a side view of a face and a front view of a face. With each processing step and image generated by the AI unit 152, the information from each of blocks 204, 206 and 208 are fed into a machine learning algorithm (block 210) for the AI unit 152 to learn from. The optimized images that are fed back act as a training data set for the AI unit 152. Over time, the AI unit 152 will have learned and generated images for the most common names.

The resulting images from block 208 are then transmitted to the input/output interface 150 (block 212). Images outputted by the AI unit 150 may also be sent to a graphic designer for optimization prior to being sent to the input/output interface 150.

Figure 2B:
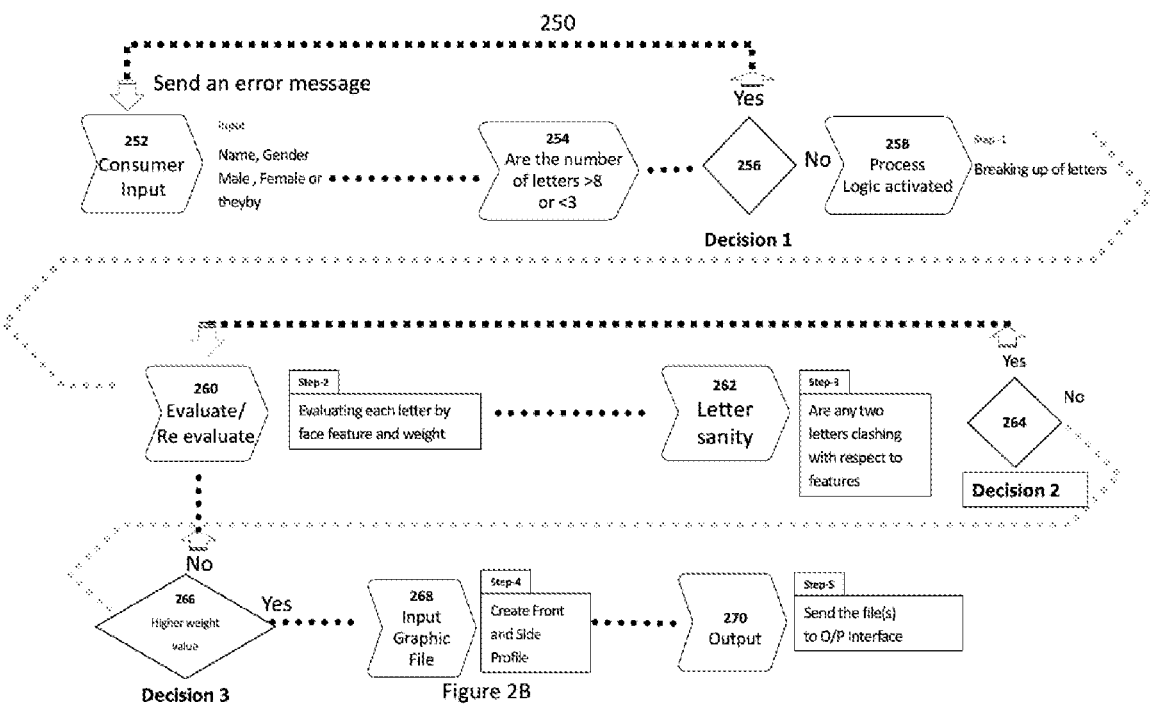
FIG. 2B is a process diagram of the AI program in accordance with another example embodiment of the present application.

FIG. 2B illustrates a process diagram 250 of the AI program performed by the AI unit 152 in accordance with another example embodiment of the present application. A consumer input is received from the input/output interface 150. The input may include for example name and gender information (block 252). Next the AI unit 152 processes the inputs and determines the number of letters in the name (block 204). If it is determined that the name has more than 8 characters or less 3 characters, an error message is sent to the input/output interface 150 (block 256). Next, the AI unit's 152 process login is activated, and the name input is parsed into its letter elements (block 258). Each letter is evaluated to determine its suitability for various facial features and weight (block 260). Weight is a defined scale that determines the prioritization of letters. For example, certain letters given their general shape may be prioritized to be used for visual features (e.g., 'a' or 'o' for eyes). There may be other reasons for why a visual element of a character is given a higher weight than other visual depictions of that letter. For example: a"s visual depiction as contour of a face will be given higher weight than it being a nose factoring in the appealability (e.g., aesthetic). Similarly, the letter 'n' as a visual element may be given higher weight as an inverted 'n' depicting a smile as opposed to right side up 'n' that may depict a frown. Whereas the same logic cannot be applied to the letter 'u'. In this example case the right side up will have more weightage than the inverted 'u' again for appealability reasons. Weight based assessment is considering the current assigned weights to each letter to enable decision making. Higher the weight given to each image higher the AI preference to use that latter in the final construction of the image. The AI unit 152 then checks to determine if the allocation of each letter to a facial feature is suitable (block 262). For example, it is determined whether two letters are clashing with respect to facial features (block 264). Clashing may include or mean that two different letters are given the same weightage for one facial feature. In case of such a clash the AI unit 152 goes into a decision making mode. For block 264 (e.g., decision 2), if 'Yes' means that the letter needs to be revaluated for a lesser weighted feature. If there are letters clashing (block 264) 'Yes', then the process reverts back to block 260, and if it is determined that there is 'No' clash, then the process moves to block 266. At block 266 it is determined if the letter is a higher weight value, if 'No' the process reverts back to block 260, if 'Yes' then the process moves to block 268. For example, where there is a and n that may be used as a representation of the nose feature. If both letters have the same weight, then the algorithm goes back to re-evaluating both letters with the next feature set which could be eyes or mouth. After this once again if there is a clash in 264 then the process will loop back to block 260. This will repeat until there is no more clash in 264 or the feature set is exhausted in which scenario both letters will be dropped from the final visual as an exception. Next, the visual image is generated from the letter visual elements, for example a front and side profile of a face may be created (block 268). The resulting visual image file is transmitted to the input/output interface 150 (block 270).

The generated image may then be applied to various products and merchandise which the consumer may select from. For example, the products and merchandise may include jewelry (e.g., earrings, pendants, rings, lockets, cufflinks, bracelets), stationary (e.g., greeting cards, notebooks, letter pads, pencil, eraser, book marks), apparel (e.g., t-shirt, cap, socks), cookware, tableware, and various accessories (e.g., cell phone cases, laptop cases, holiday ornaments, nameplates, bumper sticker). In an embodiment, the generated images may be used as part of a game (e.g., computer game, mobile game, video game, app etc.). For example, the generated images may be presented on the screen to a game user, and the game user has to guess what name is visually encoded in the image. The system may include a game module for users to create their own images by modifying individual elements using for example touchscreen gestures (e.g., drag, rotate, scale, mirror). These individual elements may be generated using the system and method of the present application, depending on the user's choice of letters. The user-generated images may be, for example, exported to the e-store to purchase a product with said user-generated design, shared on social media, re-used within the game, and used to improve the AI's generated images. The game may have various functionality such as in-app purchases, in-game ads, links to social media pages and websites. Users may accumulate points as they correctly guess the name encoded in the image. Multiplayer mode may allow users to use the internet to play against each other for a fixed duration in a session. For example, the user with the most points at the end of the session, wins that multiplayer session.

In the example embodiments of the present application, the images are generated using language characters (e.g., letters) in the Latin/Roman alphabet. However, in other embodiments the images may be generated using language characters of other alphabet type languages as well as other types of writing systems, such as for example logographic and abugida. For example, the images may be generated using language characters for languages such as Arabic, Chinese, Kana, Greek, Hebrew, Devanagari, Bengali-Assamese, and Gujarati.

FIGS. 3 to 23 illustrate examples of the construction process of an image by the AI unit 152 using the letters of a name to generate an image of a face. For each figure, on the left side are the language characters (e.g., letters) and on the right side are the visual elements representing the language characters in the name. The figures illustrate how the overall image is built with each letter in a name being added to the image until all the letters in the name have been incorporated into the image. Although the figures show the building of the image starting sequentially with the first letter in each name (e.g., for the name 'Amy' as shown in FIG. 4, the figure illustrates the use of the 'A' first, then 'm' and then 'y'), the AI unit 152 may construct the image by starting with identifying and determining what letters to use as visual elements for particular facial features (e.g., determine letters to be used for 'eyes' first, then 'mouth' etc.).

Figure 3:
FIG. 3 illustrates a process for constructing a face image using the name 'Alex' in accordance with an example embodiment of the present application.
Figure 3:
Figure 3:

FIG. 3 illustrates a construction process 300 for constructing a face image using the name 'Alex' as the primary input data and the secondary input data as the emotion 'pensive' according to an example embodiment of the present application. In the example, a human eye 302 is formed using a small capital alphabet letter 'A'. The 'A' is rotated suitably to about 90 degrees to the right from the horizontal, to represent the human eye in a side view configuration. Next, a human nose 304 is formed using a skewed capital letter positioned at a slant to the left of the eye 302, with the shape of the following the contour of a typical human nose. Hair 306 is formed with a stylized or freehand drawn contoured capital letter 'E'. Then, lips 308 and apart of a chin 310 are formed with a capital letter 'X' that has a curved and extended line. The resulting image 350 is a side profile image of a human face that is constructed from and incorporates each of the alphabet letters in the name 'Alex' and depicts the face with a 'pensive' facial expression.

Figure 4:
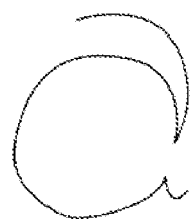
FIG. 4 illustrates a process for constructing a face image using the name 'Amy' in accordance with an example embodiment of the present application.
Figure 4:
Figure 4:

FIG. 4 illustrates a construction process 400 for constructing a face image using the name 'Amy' as the primary input data and the secondary input data as the emotion 'crinkly happy' according to an example embodiment of the present application. In this example, different parts (e.g., strokes) of a single letter are used to depict different facial features. In the example, a lower case cursive character of the letter 'a' is adjusted such that the lower half forms a front view of a round face 402, an incomplete tail of the character forms an ear 404, while a top portion of the cursive character depicts hair 406. A lower case 'm' letter is utilized in a flattened and widened format to form eyes 408. Then, a lower case 'y' letter in a cursive format is suitably tilted to form both part of the nose 410 as well as lips 412. The resulting image 450 is a front view image of a human face that is constructed from and incorporates each of the alphabet letter sin the name 'Amy' and depicts the face with a 'crinkly happy' facial expression.

Figure 5:
FIG. 5 illustrates a process for constructing a face image using the name 'David' in accordance with an example embodiment of the present application.
Figure 5:
Figure 5:
Figure 5:
Figure 5:

FIG. 5 illustrates a construction process 500 for constructing a face image using the name 'David' as the primary input data and the secondary input data as the emotion 'speculative' according to an example embodiment of the present application. In the example, the male name 'David' is suitable for full frontal representation. As the name 'David' contains two 'd' letters, each eye is formed out of each 'd' by using the capital alphabet 'D' rotated suitably to about 90 degrees to the left, flattened suitably and embellished to resemble a human eye. A first eye 502 is shown. Then, a face 504 is formed utilizing a vertical, contoured capital 'V'. Hair 506 is formed using a lower case letter 'a' at the top of the 'V'. A capital letter 'I' is placed in the middle of the face 504 with the base of the 'I' forming the lips 508 of the mouth. The rest of the letter 'I' is slightly off-centre on the face 504 and disjointed from the base, in order to form a nose 510 and a brow of forehead 512. The resulting image 550 is a front view image of a human face that is constructed from and incorporates each of the alphabet letters in the name 'David' and depicts the face with a 'speculative' facial expression.

Figure 6:
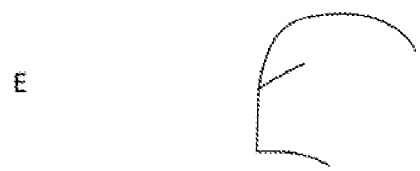
FIG. 6 illustrates a process for constructing a face image using the name 'Emily' in accordance with an example embodiment of the present application.
Figure 6:
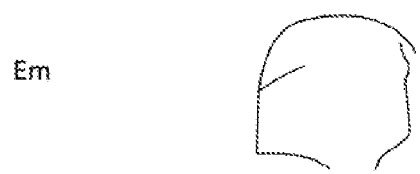
Figure 6:
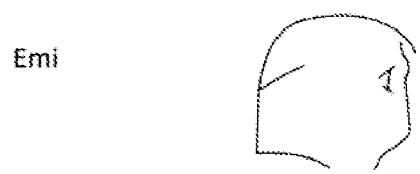
Figure 6:
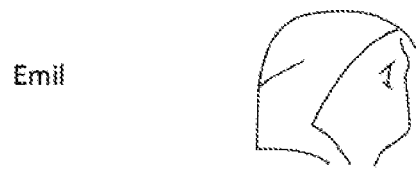
Figure 6:
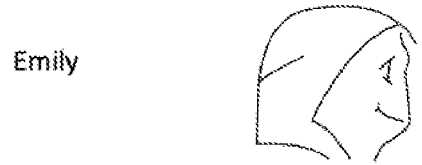

FIG. 6 illustrates a construction process 600 for constructing a face image using the name 'Emily' as the primary input data and the secondary input data as the emotion 'satisfied' according to an example embodiment of the present application. In the example, the female name 'Emily' is suitable for side view representation. A large capital alphabet letter 'E,' skewed and with the upper portion overhanging, forms a major portion of the image primarily head and hair 602. An artistically represented 'm,' suitably flattened, rotated suitably through about 90 degrees to the right, forms a brow and nose profile 604. The alphabet 'I' is placed in the position of a normal eye 606, with its top and bottom limbs skewed, to represent a wide open, human eye. A capital letter 1' is placed, beginning at the intersection of 'E' and 'm' and its base which is turned to about 60 degrees to the vertical, separates the hair 608 from the face. The alphabet letter 'y' is used to complete the image, placed at a slight inclination to the horizontal plain, and forms a smile 610. In the assembled image 650, the central arm or limb of skewed alphabet 'E' drawn at an angle of about 30 degrees to the horizontal, represents a hair clip 612 worn by a woman. The resulting image 650 is a side view image of a human face that is constructed from and incorporates each of the alphabet letters in the name 'Emily' and depicts the face with a 'satisfied' facial expression.

Figure 7:
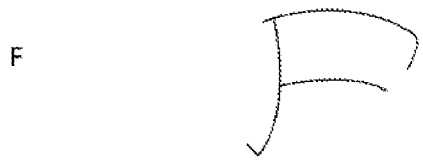
FIG. 7 illustrates a process for constructing a face image using the name 'Fion' in accordance with an example embodiment of the present application.
Figure 7:
Figure 7:
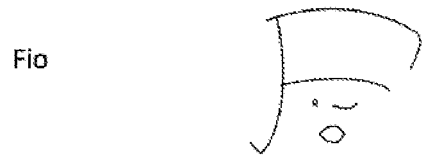
Figure 7:

FIG. 7 illustrates a construction process 700 for constructing a face image using the female name 'Fion' as the primary input data and the secondary input data as the emotion 'puzzled' according to an example embodiment of the present application. In the example, the name 'Fion' can be represented in full frontal view, comprising firstly of a large 'F' with two curved, parallel upper limbs forming the main body 702 of the image, with the top limb of the alphabet overhanging and bent down towards its right hand extremity, at an angle of about 15 degrees, remaining incomplete and slightly separated from the middle limb of the alphabet. The vertical limb curves to the left, with a slight tail, to represent tresses 704 (e.g., hair) of a woman. Overall, the image represents a woman wearing a stylish hat 706. The alphabet letters 'I' and 'o' are positioned relative to each other to form the eyes and mouth 708, respectively, with the face winking, with one eye open 710 and the other eye closed 712. The alphabet letter 'n' is used in its cursive and mirror image form to complete the rest of the face 714 and the other tress 716 of the woman. The resulting image 750 is a front view image of a human face that is constructed from and incorporates each of the alphabet letters in the name 'Fion' and depicts the face with a 'puzzled' facial expression and wearing a hat.

Figure 8:
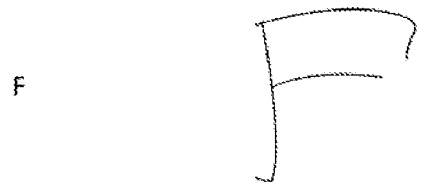
FIG. 8 illustrates a process for constructing a face image using the name 'Fiona' in accordance with an example embodiment of the present application.
Figure 8:
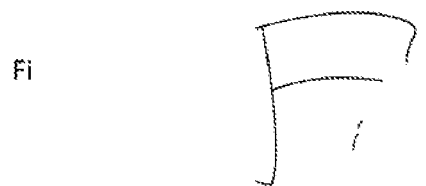
Figure 8:
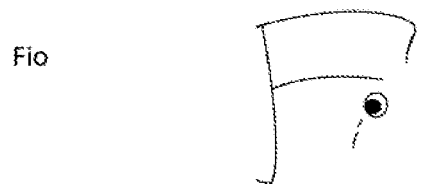
Figure 8:
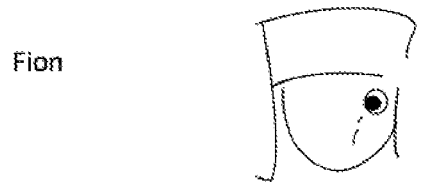
Figure 8:
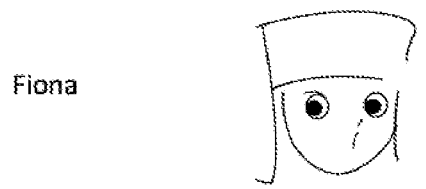

FIG. 8 illustrates a construction process 800 for constructing a face image using the female name 'Fiona' as the primary input data and the secondary input data as the emotion 'surprised' according to an example embodiment of the present application. In the example, the name 'Fiona' is a variant of 'Fion' shown in FIG. 7. The construction of the image utilizes the letter 'F' and 'n' in the same manner as FIG. 7 to form a hat 802, hair 804 and face 806. In this example, the eyes and mouth are different to reflect the different emotion conveyed and to incorporate the additional letter 'a'. The alphabet letter 'a' is used in its mirror-image, cursive form for form an eye 808. The eyes are further embellished to reflect the emotion to be depicted. The alphabet letter 'I' is re-positioned to suggest the hint of a nose 810 and pouting mouth 812. The resulting image 850 is a front view image of a human face that is constructed from and incorporates each of the alphabet letters in the name 'Fiona' and depicts the face with a 'surprised' facial expression and wearing a hat.

Figure 9:
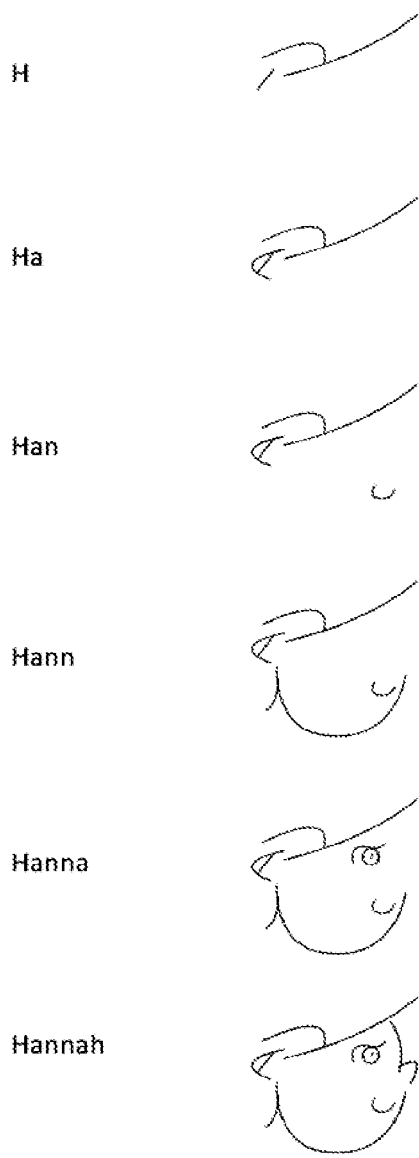
FIG. 9 illustrates a process for constructing a face image using the name 'Hannah' in accordance with an example embodiment of the present application.

FIG. 9 illustrates a construction process 900 for constructing a face image using the female name 'Hannah' as the primary input data and the secondary input data as the emotion 'determined' according to an example embodiment of the present application. In the example, the name 'Hannah' is constructed in a side face view with a small letter, cursive, mirror image 'h' having its vertical limb slightly curved and placed at about a 30 degree angle to the horizontal and with the lower curved limb slightly overhanging, forming a hairline 902. A small, skewed capital 'A' is placed tilted to the left at an angle of about 20 degrees to the plain and with its right leg just within the boundary of the base of the 'h.' Together, the above arrangement depicts a human ear 904, with the hairline boundary above 902 and the upper portion of the head not focused upon. The lower portion of the face 906 is constructed using a large cursive, mirror image 'n' with another smaller, cursive mirror image 'n' nestled to form a mouth 908. An eye 910 is composed of a small cursive 'a' rotated at 90 degrees to the left of the plain. A cursive 'h' similar to the one described above, but placed horizontally completes a forehead 912 and a nose 914 of the image. The resulting image 950 is a side view image of a human face that is constructed from and incorporates each of the alphabet letters in the name 'Hannah' and depicts the face with a 'determined' facial expression.

Figure 10:
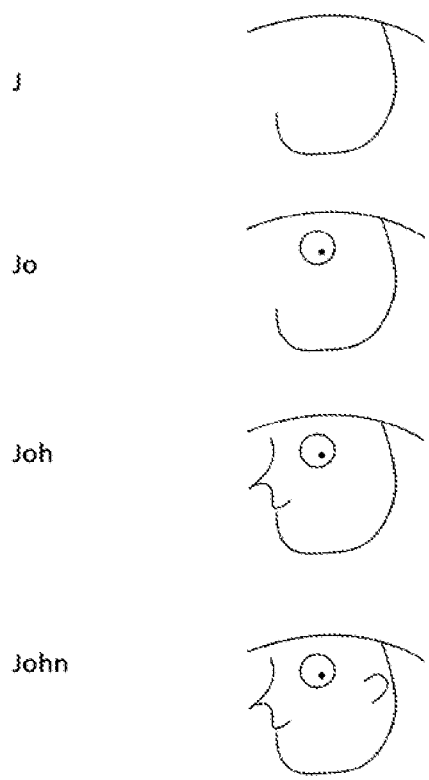
FIG. 10 illustrates a process for constructing a face image using the name 'John' in accordance with an example embodiment of the present application.

FIG. 10 illustrates a construction process 1000 for constructing a face image using the male name 'John' as the primary input data and the secondary input data as the emotion 'inventive' according to an example embodiment of the present application. In the example, the image is depicted as a side view, facing left, with a large, cursive capital T rather like a circle fishhook, forming the main body of the face 1002. A capital alphabet letter '0' is placed as a conventional eye and embellished with an off-centre dot in the fourth quadrant (e.g., lower left), to resemble a human eye 1004 looking down. A cursive, small 'h' inclined completes the front portion of the front profile 1006 of the face 1002. An alphabet letter small 'n' is artistically positioned to depict a human ear 1008. The resulting image 1050 is a side view image of a human face that is constructed from and incorporates each of the alphabet letters in the name 'John' and depicts the face with an 'inventive' facial expression.

Figure 11:
FIG. 11 illustrates a process for constructing a face image using the name 'Lawrence' in accordance with an example embodiment of the present application.
Figure 11:
Figure 11:
Figure 11:

FIG. 11 illustrates a construction process 1100 for constructing a face image using the male name 'Lawrence' as the primary input data and the secondary input data as the emotion 'mournful' according to an example embodiment of the present application. In the example, the name 'Lawrence' is represented as a frontal view, with the face turned slightly to the left. The first alphabet in the name is 'L' and it is positioned to form a nose 1102. The name contains two 'E's. The first capital alphabet 'E' is artistically rendered, resembling somewhat a small, curled shrimp and forms the principal outline of the face 1104. A smaller similar, reverse image 'E' at the right hand extremity, attaches on as an ear 1106 through a reverse image capital 'A' having its left limb placed vertical to the plain and thus providing an outline of the right side face boundary 1108. Alphabet letter 'n' in the form of a mirror image, is artistically rendered to denote a closed eye 1110. Alphabet letter 'c' has been placed to form a left ear 1112. A capital 'R' rotated through about 90 degrees to the right and embellished with a dot, forms a right eye 1114. The small alphabet letter 'w' is represented in reverse image format as an artistic squiggle to denote lips 1116. The resulting image 1150 is a front view image of a human face that is constructed from and incorporates each of the alphabet letters in the name 'Lawrence' and depicts the face with a 'mournful' facial expression. In other embodiments, elements in the image 1150 may be used to depict a character such as for example a pirate.

Figure 12:
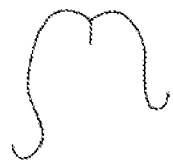
FIG. 12 illustrates a process for constructing a face image using the name 'Marika' in accordance with an example embodiment of the present application.
Figure 12:
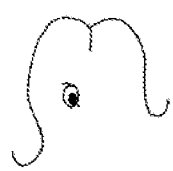
Figure 12:
Figure 12:
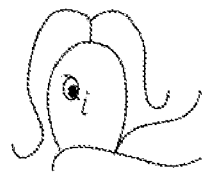
Figure 12:
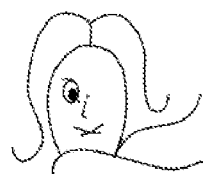
Figure 12:
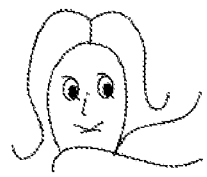

FIG. 12 illustrates a construction process 1200 for constructing a face image using the name 'Marika' as the primary input data and the secondary input data as the emotion 'mischievous' according to an example embodiment of the present application. In the example, the general outline of the face consists primarily of the capital alphabet artistically depicted with the left arm of the alphabet extended and overhanging, to depict a woman's hair 1202. The two 'a's in the name have been allocated for the eyes 1204, 1206, with embellishment for human form. A large capital 'R' has been strategically placed for form a face outline 1208, with the spine horizontal and both the limbs suitably contoured to provide the hint of a scarf 1210. Small alphabet 'I' has been inserted at a slight angle to the perpendicular, to depict a nose 1212. The capital or small alphabet 'k' has been structured to form lips 1214. The resulting image 1250 is a front view image of a human face that is constructed from and incorporates each of the alphabet letters in the name 'Marika' and depicts the face with a 'mischievous' facial expression.

Figure 13:
FIG. 13 illustrates a process for constructing a face image using the name 'Mary' in accordance with an example embodiment of the present application.
Figure 13:
Figure 13:
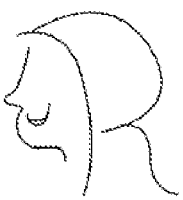
Figure 13:
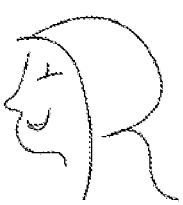

FIG. 13 illustrates a construction process 1300 for constructing a face image using the name 'Mary' as the primary input data and the secondary input data as the emotion 'contented' according to an example embodiment of the present application. In the example, the face comprising of just 4 alphabet letters has been constructed as a side view, facing left. The alphabet letter 'M' has been presented as a freehand flipped-over mirror image, positioned at about 70 degrees to the plain, facing left, forming a front face profile 1302. A capital alphabet 'A' has been inserted as a mirror image with a shorter leg in the foreground, but with an extended leg to the rear, and depicts a mouth 1304. A large capital 'R' with a sharply curving spine forms the back of the head 1306 and also representing a head covering 1308. The final alphabet letter as capital 'Y' is placed at an inclination of about 20 degrees to the plain and represents an eye 1310. The resulting image 1350 is a side view image of a human face that is constructed from and incorporates each of the alphabet letters in the name 'Mary' and depicts the face with a 'contented' facial expression and with a head covering.

Figure 14:
FIG. 14 illustrates a process for constructing a face image using the name 'Michael' in accordance with an example embodiment of the present application.
Figure 14:
Figure 14:
Figure 14:
Figure 14:
Figure 14:
Figure 14:

FIG. 14 illustrates a construction process 1400 for constructing a face image using the male name 'Michael' as the primary input data and the secondary input data as the expression 'taken aback' according to an example embodiment of the present application. This left-facing, male face comprises of a large capital 'M' with legs positioned at about 60 degrees in the first quadrant that forms the side hair profile 1402. The M is surrounded by a large capital 'C' to form the back of the head 1404. Close to and within the M is a cursive artistically contoured 'h' with overhanging second leg, to depict a human ear 1406. An alphabet letter 'A' in the name has been inserted as a capital 'A' rotated 90 degrees to the right, in order to form an eye 1408. An alphabet letter 'I' appears in a skewed form and forms a mouth 1410 and also a portion under a nose. The nose 1412 is comprised of the alphabet 1' which has been artistically contoured and eventually joins the alphabet 'I' to complete the frontal portion of the face. Finally, the second alphabet letter 'E' has been artistically rendered, facing downwards, with incomplete lower leg, to depict the collar of a shirt 1414. The resulting image 1450 is a side view image of a human face that is constructed from and incorporates each of the alphabet letters in the name 'Michael' and depicts the face with a 'taken aback' facial expression and also shows the collar of the shirt 1414.

Figure 15:
FIG. 15 illustrates a process for constructing a face image using the name 'Paul' in accordance with an example embodiment of the present application.
Figure 15:
Figure 15:
Figure 15:
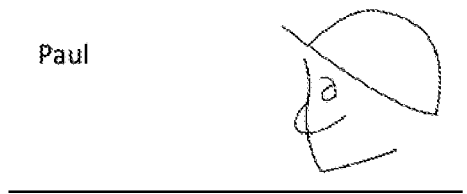

FIG. 15 illustrates a construction process 1500 for constructing a face image using the male name 'Paul' as the primary input data and the secondary input data as the emotion and expression 'sneering' according to an example embodiment of the present application. In the example, this 4-alphabet letter male name is depicted in its side view, facing left. The principal components are a large reverse image 'P' at an angle of about 30 degrees to the plain, with its base pointing to the top of the first quadrant, forming a hat 1502. A lower case alphabet letter 'a' forms an eye 1504. A capital alphabet 'U' has been placed at a 3-D angle to the face. The alphabet 'U' is then intersected by a large artistically rendered, capital alphabet 'L.' Together both 'U' and 1' form a nose 1506, a mouth 1508, a front portion of the face 1510 as well as a jawline 1512 of the face. The resulting image 1550 is a side view image of a human face that is constructed from and incorporates each of the alphabet letters in the name 'Paul' and depicts the face with a 'sneering' facial expression. Overall, the image resembles a man wearing the peak cap 1502 (e.g., baseball cap), placed at a jaunty angle with the visor 1503 pointing forwards and upwards.

Figure 16:
FIG. 16 illustrates a process for constructing a face image using the name 'Sarah' in accordance with an example embodiment of the present application.
Figure 16:
Figure 16:
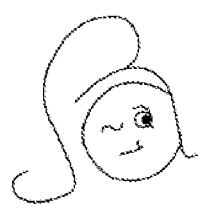

FIG. 16 illustrates a construction process 1600 for constructing a face image using the name 'Sarah' as the primary input data and the secondary input data as the emotion and expression 'lovesick' according to an example embodiment of the present application. In the example, the face for 'Sarah' is portrayed as a front biased image, with a major component being a large artistically rendered capital alphabet 'R' with a hanging, curled foreleg and a receding hind leg, giving it a visual climbing effect. The 'It' forms a hair profile 1602 in an elaborate hairstyle. The addition of a large, apple-type small alphabet 'a' completes the rest of facial boundary 1604. On the right the second alphabet letter 'a' is positioned and embellished as a human eye 1606. A diminutive 's' in reverse image format, placed horizontally on the left to represent a second eye 1608. Finally, a mirror image small letter 'h' is placed almost horizontally related to the chin, to represent lips 1610 and right hand corner of the mouth 1612. The resulting image 1650 is a front view image of a human face that is constructed from and incorporates each of the alphabet letters in the name 'Sarah' and depicts the face with a 'lovesick' facial expression. Overall, the image 1650 arrangement projects a girl with an elaborate hairstyle and wistful look on her face.

Figure 17:
FIG. 17 illustrates a process for constructing a face image using the name 'Sean' in accordance with an example embodiment of the present application.
Figure 17:
Figure 17:
Figure 17:

FIG. 17 illustrates a construction process 1700 for constructing a face image using the male name 'Sean' as the primary input data and the secondary input data as the emotion and expression 'stylish' according to an example embodiment of the present application. In the example, the construction of 'Sean' is shown with a front face view. A large capital '5' placed horizontally and generously spaced, with a prominent overhanging loop on the left, ending in a shorter, trailing tail to the right forms hair 1702. An alphabet letter e' in its lower case form is emphasized, with a dot to represent a human eye 1704. A large, bowl-shaped 'n' in its small form and placed as a reverse mirror image (backwards and also upside down) forms the entire boundary of the face 1706. Finally, a skewed narrow capital 'A' forms a mouth 1708. The resulting image 1750 is a front view image of a human face that is constructed from and incorporates each of the alphabet letters in the name 'Sean' and depicts the face with a 'stylish' facial expression. The overall image 1750 is of a young man with a mop of hair and a secretive smile.

Figure 18:
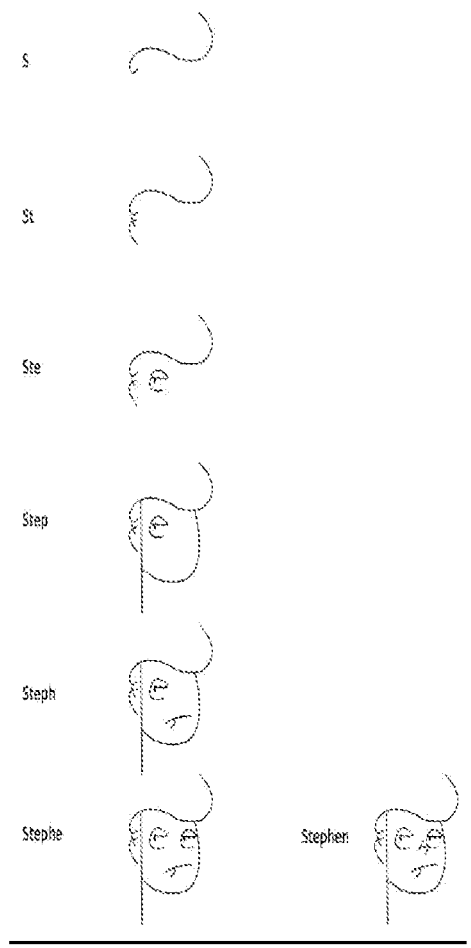
FIG. 18 illustrates a process for constructing a face image using the name 'Stephen' in accordance with an example embodiment of the present application.

FIG. 18 illustrates a construction process 1800 for constructing a face image using the male name 'Stephen' as the primary input data and the secondary input data as the emotion and expression 'exhausted' according to an example embodiment of the present application. In the example, the representation is front facing, but right hand biased. A unique aspect in this construction is that three alphabet letters '5', 'T' and 'P' are integrated so that they share a common structure 1802. The alphabet '5' forms the top of a head 1804 with a mirror image commencing with a narrow loop on the left, while culminating in a prominent trailing loop on the right, representing an abundance of hair 1806. A sharp vertical line is attached to the leading loop of the '5' and thus an artistically rendered, capital 'T' is formed, and depicts a side border 1808 of the face. A generous loop is added on the right to represent 'P', thus forming the boundary 1810 of the face. Meanwhile, alphabet 't' in its lower case form is added on the extreme left to represent an ear 1812. Thereafter alphabet 'h' is positioned almost horizontally to the chin, to form lips (e.g., mouth) 1814 and a corner 1816 of the mouth. The sole 'n' from the name is utilized strategically for a nose 1818. The name 'Stephen' has two 'e's. These are used for constructing both eyes 1820, 1822 with embellishment of dots, to give the overall impression of an intelligent, but dreamy-eyed young man. The resulting image 1850 is a side view image of a human face that is constructed from and incorporates each of the alphabet letters in the name 'Stephen' and depicts the face with a 'exhausted' facial expression.

Figure 19:
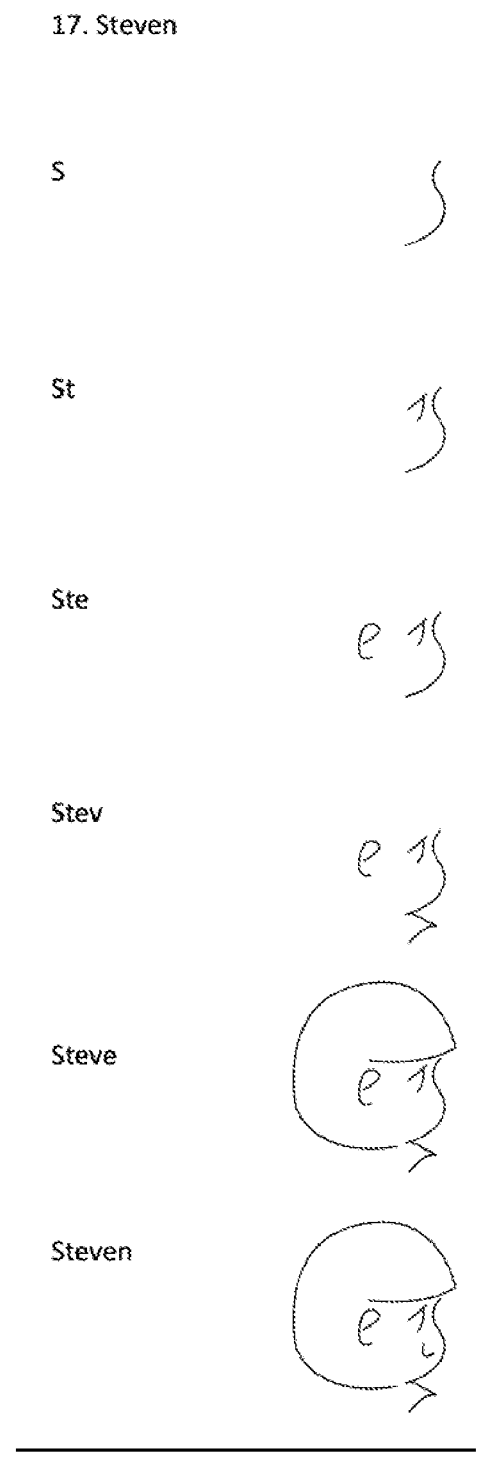

FIG. 19 illustrates a construction process 1900 for constructing a face image using the male name 'Steven' as the primary input data and the secondary input data as the emotion and expression 'happy' according to an example embodiment of the present application. In the example, a right-hand side facing image is constructed comprising a large round alphabet e' in its small form, forming the outline of a face 1902 and hair 1904. It is integrated with a vertically placed, freehand drawn capital or small 's' with which forms a front profile 1906 of the face. A reverse mirror image cursive small 'n' represents a mouth 1908. The alphabet 'e' in its small form is nestled within the larger 'e' and angled upwards, to depict an ear 1910. An alphabet capital 'T' in its skewed format has innovatively been placed to be an eye 1912 of the face. Finally, a capital alphabet letter 'V' is utilized by rotating it 90 degrees to the left, so that its base faces right and it is attached below the chin through its upper limb, forming a partial shirt collar 1914. The resulting image 1950 is a side view image of a human face that is constructed from and incorporates each of the alphabet letters in the name 'Steven' and depicts the face with a 'happy' facial expression.

Figure 20:
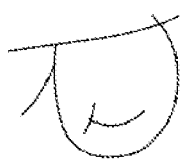
FIG. 20 illustrates a process for constructing a face image using the name 'Trevor' in accordance with an example embodiment of the present application.
Figure 20:
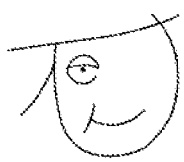
Figure 20:
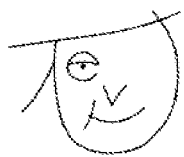
Figure 20:
Figure 20:
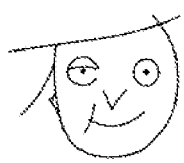

FIG. 20 illustrates a construction process 2000 for constructing a face image using the male name 'Trevor' as the primary input data and the secondary input data as the emotion and expression 'inebriated' according to an example embodiment of the present application. In the example, a front-facing male image is constructed. A large capital alphabet 'R' with a large, pronounced loop, positioned in a general downward facing direction, with its spine rising from left to right at an angle of about 30 degrees to the plain. This arrangement forms the outer face boundary 2002. A lower case alphabet letter 'r' is attached to the face on the left to depict an ear 2004. Other facial features are similar to previous examples of the technique—of the two eyes, a left eye 2006 is formed with the alphabet 'e' in its small form. A right eye 2008 is formed using the small alphabet 'o' from the name. Both eyes are enhanced with dots, to represent human eyes. Capital alphabet 'V' is placed as a conventional nose 2010. An artistically rendered capital 'T' is placed approximately horizontally, parallel to the chin, with its head forming a left cheek 2012 and its body forms lips 2014. The resulting image 2050 is a front view image of a human face that is constructed from and incorporates each of the alphabet letters in the name 'Trevor' and depicts the face with a 'inebriated' facial expression.

Figure 21:
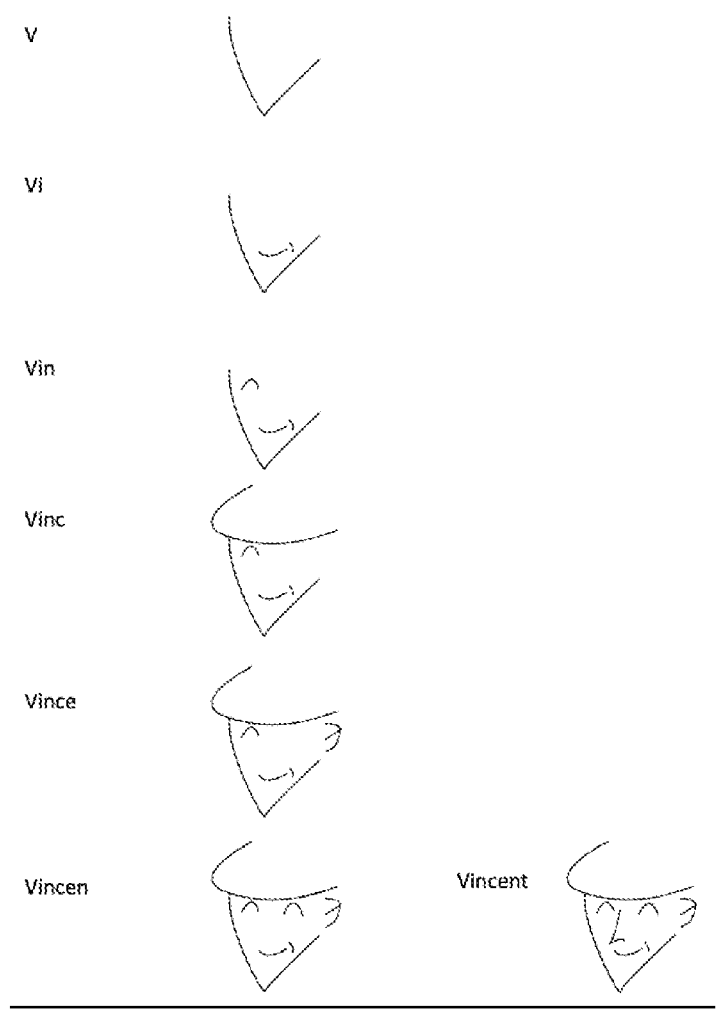
FIG. 21 illustrates a process for constructing a face image using the name 'Vincent' in accordance with an example embodiment of the present application.

FIG. 21 illustrates a construction process 2100 for constructing a face image using the male name 'Vincent' as the primary input data and the secondary input data as the emotion and expression 'self-satisfied' according to an example embodiment of the present application. In the example, the image of a male, front-facing, comprises of an incomplete capital alphabet 'V' with the limb in the foreground longer than the one in the background, forming a lower face 2102 boundary. A large cursive capital 'C' is placed at a 3-D angle, attached to the left limb of the 'V' forms a top boundary 2104 of the face. An alphabet letter 'E' in its cursive, reverse image form, is placed to form an ear 2106 in the gap between the 'C' and the right limb of the 'V.' Since the name has two 'n's they are convenient for forming the eyes 2108, 2110. Finally, an artistically rendered capital 'T' is placed approximately at an angle of 30 degrees to the plain, with its body forming lips 2112 and its head portion forming a dimple 2114 on the right cheek. The resulting image 2150 is a side view image of a human face that is constructed from and incorporates each of the alphabet letters in the name 'Vincent' and depicts the face with a 'self-satisfied' facial expression.

Figure 22A:
FIGS. 22A and 22B illustrate processes for constructing face images using the name 'Cassandra' with two different secondary inputs in accordance with an example embodiment of the present application.
Figure 22A:
Figure 22A:
Figure 22A:
Figure 22A:
Figure 22A:
Figure 22A:
Figure 22A:
Figure 22A:
Figure 22B:
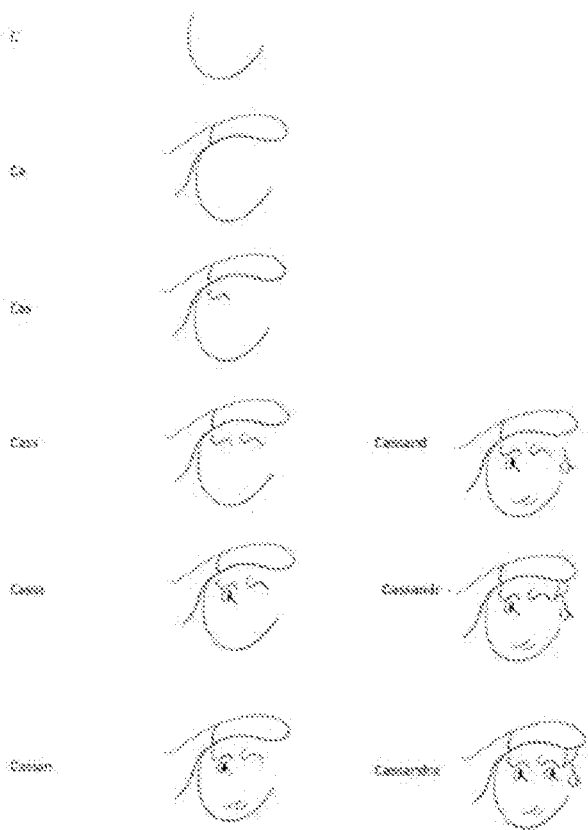

FIGS. 22A and 22B illustrate processes for constructing face images using the name 'Cassandra' with two different secondary inputs in accordance with an example embodiment of the present application. FIG. 22A illustrates a construction process 2200 for constructing a face image using the name 'Cassandra' as the primary input data and the secondary input data as the emotion and expression 'concerned' according to an example embodiment of the present application. FIG. 22B illustrates a construction process 2260 for constructing a face image using the name 'Cassandra' as the primary input data and the secondary input data as the emotion and expression 'undecided' according to an example embodiment of the present application.

Figure 23A:
FIGS. 23A and 23B illustrate processes for constructing face images using the name 'Kate' in accordance with an example embodiment of the present application.
Figure 23A:
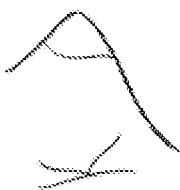
Figure 23A:
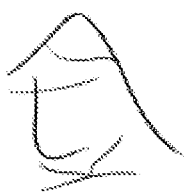
Figure 23A:
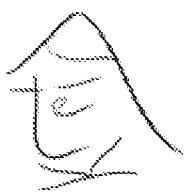
Figure 23B:
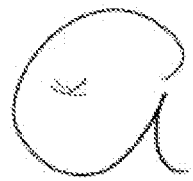
Figure 23B:
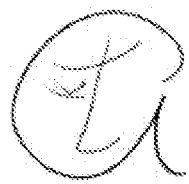
Figure 23B:

FIGS. 23A and 23B illustrate processes for constructing face images using the name 'Kate' in accordance with an example embodiment of the present application. For example, the AI unit 152 may send more than one generated image (block 114) to the input/output interface 150 and the user (e.g., consumer) can select one of the designs (block 116). FIG. 23A illustrates a construction process 2300 for constructing a face image using the name 'Kate' as the primary input data according to an example embodiment of the present application. In this example, the letter 'k' is used to form a mouth 2302, a capital 'A' is used as the outline of a head and hair 2304, the letter 't' is used for a nose and eyebrows 2306, and a lowercase 'e' is used for an eye 2308. The resulting image 2350 is a side view image of a human face that is constructed from and incorporates each of the alphabet letters in the name 'Kate'. FIG. 23B illustrates a construction process 2360 for constructing an alternative face image using the name 'Kate' as the primary input data according to an example embodiment of the present application. In this example, the letter 'k' is used to form a first eye 2362 (e.g., the 'k' is used to represent an eye in this example instead of how it was used in FIG. 23A to represent a mouth), a lowercase 'a' is used as the outline of a head 2364, the letter 't' is used for a nose and eyebrows 2366, and an uppercase 'E' is used to form a second eye 2368. The resulting image 2280 is a front view image of a human face that is constructed from and incorporates each of the alphabet letters in the name 'Kate'.

What has been described above includes an example of the disclosed system, method and architecture. It is, of course, not possible to describe every conceivable combination of components and/or methodologies, but one of ordinary skill in the art may recognize that many further combinations and permutations are possible. Accordingly, the system, method and architecture described herein are intended to include all such alterations, modifications and variations. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A method for generating images, the method comprising:
   receiving a word comprising language characters;
   parsing the word into individual characters;
   determining one or more image elements that depict each of the individual characters;
   evaluating each of the one or more image elements of the individual characters to determine suitability for one or more facial features;
   assigning a single image element for each of the individual characters; and
   generating an image using the assigned image element of each of the individual characters, the image including the one or more facial features.

2. The method of claim 1, wherein the step of determining further comprises:
   assigning a corresponding weight to each of the one or more image elements.

3. The method of claim 2, wherein the corresponding weight is a defined scale that determines prioritization of letters.

4. The method of claim 2, further comprising:
   determining if two or more of the image elements of the individual letters are assigned the same weight for one facial feature.

5. The method of claim 4, further comprising:
   re-evaluating at least one of the two or more image elements of the individual letters for a lesser weighted facial feature.

6. The method of claim 1, wherein the step of generating the image further comprises optimizing features of the visual elements to form the image.

7. The method of claim 6, wherein the features of the visual elements includes size, orientation, and position.

8. The method of claim 1, wherein the generated image depicts a human face and features of the human face are assigned and depicted using the visual elements of the language characters.

9. The method of claim 1, wherein the word is visually encoded in the generated image.

10. The method of claim 1, wherein the generated image is comprised solely of the visual elements of the language characters.

11. The method of claim 1, wherein the one or more image elements include uppercase, lowercase and cursive depictions of the language characters.

12. The method of claim 1, further comprising outputting the generated image to a remote device.

13. The method of claim 1, further comprising receiving an input from a user that includes a name as the input or both the name and at least one of an emotion, mood and expression for the one or more facial features and using the input in the evaluating step.

14. The method of claim 1, further comprising:
receiving input from a user to form an adjusted version of the one or more of the visual elements in the image; and
using machine learning to similarly adjust a future image provided to a future user using the adjusted version of the one or more of the visual elements.

15. A system for generating images, the system comprising:
a processor, wherein the processor performs the steps of:
receiving a word comprising language characters;
processing each of the characters in the word into visual elements;
generating an image using the visual elements of the characters;
receiving input from a user to form an adjusted version of the one or more of the visual elements in the image; and
using machine learning to similarly adjust a future image provided to a future user using the adjusted version of the one or more of the visual elements.

16. The system of claim 15, wherein the processor is an artificial intelligence (AI) processor.

17. The system of claim 15, wherein the processor further performs the step of outputting the generated image to a remote device.

18. A non-transitory computer readable medium having stored thereon a set of computer readable instructions that when executed by at least one processor, causes the processor to generate an image, the steps comprising:
receiving a word comprising language characters;
parsing the word into individual characters;
determining one or more image elements that depict each of the individual characters;
evaluating each of the one or more image elements of the individual characters to determine suitability for one or more facial features;
assigning a single image element for each of the individual characters; and
generating an image using the assigned image element of each of the individual characters, the image including the one or more facial features.

19. The non-transitory computer readable medium of claim 18, wherein the processor is an artificial intelligence (AI) processor.

20. The non-transitory computer readable medium of claim 18, further comprising the step of outputting the generated image to a remote device.

* * * * *